United States Patent [19]

Head

[11] 4,309,289

[45] Jan. 5, 1982

[54] METHOD OF FILTERING OIL FROM OIL-AND-WATER EMULSIONS

[75] Inventor: Brian A. Head, Maidstone, England

[73] Assignee: Whatman Reeve Angel Limited, Maidstone, England

[21] Appl. No.: 128,138

[22] Filed: Mar. 7, 1980

Related U.S. Application Data

[63] Continuation of Ser. No. 874,846, Feb. 3, 1978, abandoned.

[30] Foreign Application Priority Data

Apr. 7, 1977 [GB] United Kingdom ............... 5008/77

[51] Int. Cl.³ .......................................... B01D 17/04
[52] U.S. Cl. ................................. 210/649; 210/488; 210/799; 210/DIG. 5
[58] Field of Search ............... 210/488, 649, 767, 799, 210/DIG. 5

[56] References Cited

U.S. PATENT DOCUMENTS 3,767,054 10/1973 Farrow et al. ............... 210/488 X
4,102,785 7/1978 Head et al. ........................ 210/767

*Primary Examiner*—Frank A. Spear, Jr.
*Attorney, Agent, or Firm*—Richard P. Crowley

[57] ABSTRACT

A method of separating an oil-and-water phase from an oil-and-water emulsion, which method comprises passing the emulsion first through a wall of a prefilter composed first of fibres having an energy of adhesion of from 2 to 50 ergs/cm² to form larger oil droplets, and, thereafter, passing the larger oil droplets and the emulsion through adjacent layers of glass fibres, to separate the oil phase from the oil-and-water emulsion, and then collecting and removing the oil phase, while permitting the passage of an essentially oil-free water phase of the emulsion from the prefilter.

11 Claims, 2 Drawing Figures

METHOD OF FILTERING OIL FROM
OIL-AND-WATER EMULSIONS

This is a continuation of application Ser. No. 874,846, filed Feb. 3, 1978, now abandoned.

BACKGROUND OF THE INVENTION

This invention is concerned with pretreatment, e.g. prefilter structures which have a particular utility in the separation of oil from water in an oil/water system wherein oil is the dispersed phase and water is the continuous phase. The structure of the present invention is particularly useful when the oil/water emulsion is stabilised by the presence of a detergent.

It should be appreciated that as used herein the term "oil" means any organic liquid which is substantially immiscible with water and which either has a specific gravity appreciably from that of water or which exhibits such difference when the specific gravity of the water is altered by a solute dissolved therein.

One means for the separation of oil from oil/water emulsions involves the use of a coalescing filter designed for "inside to outside flow". Such a structure also serves to remove solid impurities in the emulsion. In this technique the emulsion is passed through the wall of a filter tube, e.g. of glass fibres held together by a resinous binder. It is possible to assist in separation efficiency by positioning a coalescing sleeve over the exterior of the tube, e.g. a sleeve of a plastics foam of relatively high pore size (e.g. 80 to 100 p.p.i.). As the emulsion passes through the wall of the filter under pressure oil droplets are coalesced and an oil phase separates from the water passing through the wall.

Unfortunately, whilst a conventional coalescing filter functions satisfactorily in the absence of detergents, when a material having appreciable surfactant properties is present in the oil/water emulsion the oil coalescing efficiency decreases appreciably.

SUMMARY OF THE INVENTION

The pretreatment structure (which may be a prefilter but is best described simply as a "winding") of the present invention is intended to be used in conjunction with an oil from water coalescing filter to at least partially overcome this problem. Thus, it has been discovered that when a fibrous material upon which oils exhibit energies of adhesion which are neither too high nor too low is fabricated into a pretreatment structure e.g. a prefilter with appropriate fibre dimensions and packing density and of appropriate thickness, such a structure may be used as indicated above with satisfactory separation efficiency.

According to the present invention there is provided a pretreatment structure, e.g. a prefilter, suitable for use in an oil from water coalescing filter and made from a woven or non-woven fibrous material upon which oils exhibit energies of adhesion of from 2 to 50 ergs/cm$^2$, the fibre dimensions and packing density and the thickness of the pretreatment structure being such that oil droplets of diameter at least 1 μm, preferably 10 μm, are captured, coalesced and larger oil droplets released upon passage of an oil/water emulsion through the pretreatment structure.

Thus, Shell Talpa 20 oil exhibits energies of adhesion of from 2 to 50 ergs/cm$^2$ upon suitable materials for the present pretreatment structure.

It will be appreciated that oil/water emulsions may contain surfactants or detergents of the same type and/or may contain other solutes. These factors, of course, affect the energy of adhesion of any particular oil with respect to a particular surface. However, the materials employed in the present invention must be such that the energy of adhesion for oils is from 2 to 50 ergs/cm$^2$ with such materials regardless of these factors.

Suitable materials for the structure or "winding" of the present invention include polypropylene and nylon.

If the energy of the adhesion of oils upon the fibres is low, the captured oil droplets leave the fibre surface too quickly for coalescence with other captured droplets to occur. However, if the energy of adhesion is too high, the captured droplets adhere so firmly to the fibre surface that even after coalescence and the formation of large droplets, the fibre will not release the coalesced oil for separation to be effected. With, e.g. polypropylene fibre, the energy of adhesion is sufficiently high for captured droplets to be held for coalescing to occur with other captured droplets, but sufficiently low for large coalesced droplets to be released.

We have found that glass fibre and epoxy resin coated glass fibre have acceptable energies of adhesion in the absence of detergents, but that in the presence of detergents the energies of adhesion are two low (approximately less than 2 ergs/cm$^2$). In the presence of detergents a higher energy of adhesion must be provided (preferably 5-20 ergs/cm$^2$). If the energy of adhesion is too high or the packing density too high, the coalesced oil is not released.

Of course, unsuitable base fibres such as glass may be provided with a coating to render them acceptable for the purposes of the present invention, e.g. a nylon and/or polypropylene coating.

It should, of course, be noted that if the liquid being filtered in a filter unit designed as a coalescing filter consists entirely of oil and water, the life of the filter unit would be infinite and prefiltration would be unnecessary. Thus prefiltration ability is irrelevant if the material to be treated is, for example, a solids-free oil/water emulsion in a laboratory and use of the present invention (regardless of prefilter ability) may therefore provide a separation technique for use in e.g. organic synthesis. However, in normal industrial practice solid particles are almost always present and are captured by the filter. The amount of solids determines the life of the filter and hence prefiltration is important since it can prolong the life of the filter unit by up to ten times. Thus, the structure of the present invention preferably functions as a prefilter in addition to being an oil coalescer.

Fibre diameter and packing density and pretreatment structure thickness are three variables which may be varied in order to fabricate a pretreatment structure of given flow resistance and efficiency properties. Thus, a prefilter, for example, can be made in accordance with the present invention to capture oil droplets in a variety of ways. In the extremes, a fine diameter fibre at a high packing density can be used, in which case the prefilter would be very thin. Alternatively, a large diameter fibre at a low density can be used, in which case the prefilter would be very thick. If the fibre possesses a high energy of adhesion, manufacture must tend towards the second extreme since the fibre separation is larger and coalesced oil droplets are very easily released. This is because the oil does not bridge across fibres thereby increasing the pressure drop.

The pretreatment structure of the present invention may have a desired physical form commensurate with its function. Thus, such structure may be cylindrical in configuration or comprise a roll or rolls of the woven or non-woven fibrous material.

As already indicated, the pretreatment structure of the present invention is normally used in conjunction with a coalescing filter comprising a filter tube (which houses the prefilter of the invention within its bore). The combination of the pretreatment structure and filter tube constitutes a filter cartridge and the invention also includes such cartridges. A filter cartridge of this type may also have an external coalescing sleeve around the filter tube to improve oil-coalescing efficiency. Furthermore, the filter tube may be reinforced. by a scrim material as described in co-pending U.S. application Ser. No. 679,569 (now abandoned) and/or provided with external reinforcement as described in co-pending U.S. patent application Ser. No. 761,027 (granted as U.S. Pat. No. 4,058,456). A retainer may be incorporated to assist in retention of the pretreatment structure within the filter tube. In addition the cartridge may be provided with end cap(s). As an alternative to end cap(s), the cartridge may be sealed by end compression of the filter tube.

The filter tube may be fabricated from non-woven, randomly disposed fibres often deposited from an aqueous slurry of the fibres (e.g. onto a cylindrical porous mandrel to which a vacuum is applied), formed into tube form, dried, and then optionally impregnated with a suitable binding agent, and dried or cured to form a semirigid self-supporting filter tube. Co-pending U.S. patent application Ser. No. 679,569 gives more details. Examples of suitable fibres are alumina, zirconia and glass, particularly borosilicate glass fibres. The fibres may range in diameter and for the application described are usually less than 10 microns; e.g., 0.1 to 3.5 microns. The binding agents may vary, and include, but are not limited to, hardened resins such as thermosetting or curable resins like phenolformaldehyde and epoxy resins, as well as silicone resins, the oxides of the fibres used such as silica for glass fibres, and other materials used as binding agents like quaternary ammonium silicates and the like. Preferably, the porous filter tubes are composed of glass fibres with hardened resin binders; although inorganic binders are useful where the tube is employed in high-temperature use.

The porous filter tube wall thickness may vary as desired, but in typical filter tubes, the wall thickness would range from about 0.1 to 0.2 inches; e.g., 0.125 to 0.15 inches, with a fibre density of about 0.15, preferably 0.10, to 0.25 grams/cc.

The filter tube must have the correct oil capture efficiency which is determined by the diameter of the fibres used. For coalescing oil droplets from water, the filter tube must be efficient at capturing 1 $\mu$m droplets. At a preferred wall thickness of about 0.2" and fibre density of about 0.2 g/cm$^3$, fibres of 0.75–1.5 $\mu$m diameter give efficiency at a good flow rate. Finer fibres could be used but flow would decrease or a thinner or less dense tube would have to be employed.

A preferred embodiment for the filter tube is microfibrous borosilicate glass bonded by a cured silicone resin which renders the tube hydrophobic and gives the fibres a silicone surface finish. Other types of fibres can be used providing that they have the required diameter and surface energy of adhesion. The silicone resin binder serves two purposes, it strengthens the tube and modifies the surface of the glass fibres to give the correct surface energy of adhesion. Polypropylene fibres can be used if they are manufactured at the required diameter. Likewise, silicone and nylon fibres. Ostensibly unsuitable fibres may have their surfaces modified by the use of appropriate binders. Thus, a polypropylene binder or a nylon binder can be used instead of the silicone resin.

A typical material for a coalescing sleeve is an open-cell porous foam or fibrous material with a usual material comprising an open-cell porous polyurethane foam, although other porous materials may be used. The pore size should be high, e.g. 80–100 p.p.i. A suitable sleeve is a 3/16" wall thickness cylinder of polyurethane foam.

Examples of suitable external reinforcements are moulded porous plastics material tubes (e.g. polypropylene), and porous metal tubes. Such materials are commercially available with relatively loose tolerances with respect to internal diameter. Alternatively, a scrim material could be used depending upon the desired burst strength, e.g. a continuous cylindrical scrim in the form of a net or mesh.

Polypropylene is preferred as an external reinforcement in view of its good chemical resistance. Co-pending U.S. patent application Ser. No. 761,027 (granted as U.S. Pat. No. 4,058,456) gives details of the method of fabrication of a filter tube as referred to above with an external reinforcement.

A preferred prefilter retainer is polypropylene mesh, especially when the pretreatment structure and/or the filter tube are made from polypropylene.

The scrim is a net-like sheet material having holes, defined by strands of continuous filaments or threads bonded at cross-over points. The scrim may be composed of inorganic or organic woven or non-woven fibres presenting a maximum open surface area to avoid interference with fluid flow. The scrim may, for example, be made of the same fibres as may be employed in the filter tube.

The invention also includes a method of separating oil from an oil/water mixture which method comprises passing the mixture through the wall of a filter cartridge comprising a filter tube as referred to above and a pretreatment structure of the invention in the bore thereof, the mixture being passed from the interior of the cartridge to the exterior thereof, and collecting oil which is coalesced upon passage of the mixture through the wall of the cartridge.

The invention further includes a method of separating oil from an oil/water mixture which method comprises passing the mixture through the wall of a filter unit which incorporates a pretreatment structure of the invention and collecting oil which is coalesced upon passage of the mixture through the filter unit wall.

The invention includes oil or an aqueous liquid which has been separated from a mixture of oil and an aqueous liquid by a method as above.

With an "oil from water" coalescing cartridge in accordance with the invention it is often possible to reduce the oil content of water from 500 ppm to less than 15 ppm even in the presence of detergents. The water/oil emulsion is passed from the inside of the cartridge to the outside. The oil droplets are captured and coalesced into large droplets which emerge on the outside of the cartridge. To effect a separation, the cartridge may be sealed in a housing, the outlet of which is situated at a low point. The oil droplets float upwards and are collected in a quiet zone at the top of the housing whilst the water goes downwards to the outlet. The oil droplets float upwards as a result of their lower specific gravity, but, of course, for this to happen the velocity of the downward flow of water must be sufficiently low.

If the oil specific gravity is greater than that of the aqueous phase, the housing would be inverted and the oil collected at the bottom, e.g. with carbon tetrachloride. The velocity of aqueous phase from the housing that can be used depends upon the difference in specific gravity between the oil and the aqueous phase.

The invention includes the combination of a filter cartridge of the invention or a filter unit incorporating a pretreatment structure of the invention and a housing having means for the collection of coalesced oil and an outlet for separated aqueous liquid. Such a combination is, as indicated above, preferably employed in a method of the invention as defined above.

BRIEF DESCRIPTION OF THE DRAWINGS

The invention will now be further described and illustrate by way of the accompanying drawings, in which.

DESCRIPTION OF THE EMBODIMENTS

Figure 1:
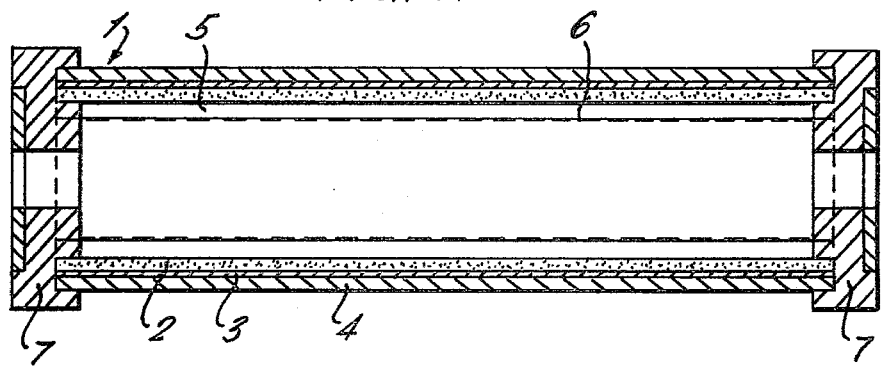
FIG. 1 shows a coalescing cartridge in accordance with the invention.

In FIG. 1, the cartridge, generally designated 1, comprises a filter tube 2 (e.g. of glass fibres impregnated with a silicone resin). The filter tube may be of any desired dimensions but typical dimensions are 2" (inside diameter)×18¾". The filter tube 2 is provided with an external reinforcement 3, preferably of polypropylene mesh. Around reinforcement 3 is a coalescing sleeve 4, preferably of polyurethane foam (e.g. 3/16" thick). Mounted coaxially inside tube 2 is a prefilter or internal winding 5 which may comprise six wraps of a polypropylene non-woven fabric and which is held in place by a retainer 6 (polypropylene mesh).

The ends of the cartridge are secured by end caps 7, which may be appropriately adapted for use with any desired associated components.

Figure 2:
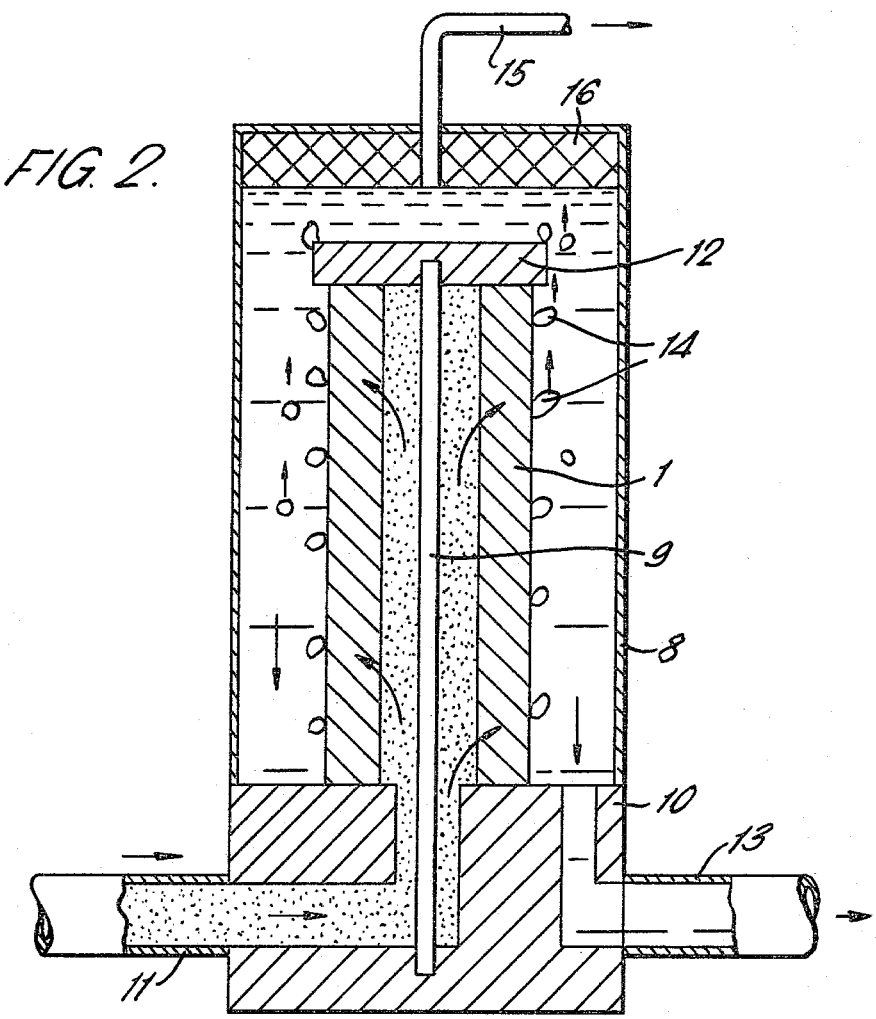
FIG. 2 shows an apparatus comprising the combination of a cartridge in accordance with the invention and a housing.

In the apparatus combination of FIG. 2, the cartridge 1 is held within a housing 8 by means of a tie rod 9 and cartridge clamping nut 12, the rod 9 being fastened to filter housing head 10. An inlet 11 is provided for the oil/water emulsion and an outlet 13 for the water which has passed through the wall of cartridge 1. At the top of housing 8 is an outlet 15 for separated oil.

In use, oil/water emulsion is led into the cartridge 1 under pressure through inlet 11. Upon passage through the wall of cartridge 1, oil droplets are coalesced and large droplets 14 are released into the body of housing 8. In the example shown in the FIG. 2, the oil is lighter than the water/aqueous phase and rises to form a layer 16 which may periodically be drawn off through outlet 15. Water flows down and out through outlet 13.

It will be appreciated that with an oil having a specific gravity greater than that of the aqueous phase, the system may be operated in an "inverted" state and a lower layer of oil collected.

There now follows an example of the invention which illustrates the nature of prefilter structures/coalescers as defined above. Comparative data is presented for various structures and their performance with a particular detergentcontaining oil/water system. In the Example, the oil used was Shell Talpa 20 and the detergent Rohm & Haas Triton X100.

| Filter Tube Type | Internal Prefilter Winding Type and Characteristics | D/S Oil con$^n$ at 500 ppm $^U$/S oil concentration using 100 ppm TX100 Detergent | Pressure Drop increase after One hours Operation | Comments |
|---|---|---|---|---|
| ⅜" Thick glass microfibre of 1.0μm fibre dia. and 0.2 g/cm$^3$ density bonded with silicone resin | Material Type: Av. Fibre Dia: Thickness: Void Volume: Energy of Adhesion: | 45 | 1 psi ↓ ↓ ↓ 5 psi | Oil removal efficiency - Unacceptably low. Pressure drop increase too high. Prefilter/precoalescer required. |
| ⅜" Thick glass microfibre of 1.0μm fibre dia. and 0.2 g/cm$^3$ density bonded with silicone resin | Material Type: Glass fibre paper Av. Fibre Dia: 2 μm 1. Thickness: 3 mm Void Volume: 92% Energy of Adhesion: <1 erg/cm$^2$ | 30 | 1 psi ↓ ↓ ↓ 2.0 psi | Pressure drop increase acceptably low since low fibre dia. and high void volume gives good prefiltration. Oil removal efficiency too low since energy of adhesion too low. |
| ⅜" Thick glass microfibre of 1.0μm fibre dia. and 0.2 g/cm$^3$ density bounded with silicone resin | Material Type: Polyprop. non woven fabric Av. Fibre Dia: 5 μm 2. Thickness: 6 mm Void Volume: 90% Energy of Adhesion: ≃20 erg/cm$^2$ | 5 | 1 psi ↓ ↓ ↓ 1.5 psi | Prefiltration and precoalescing optimized. Energy of adhesion is high enough and high void volume allows coalesced oil to migrate. |
| ⅜" Thick glass microfibre of 1.0μm fibre dia: and 0.2 g/cm$^3$ density bonded with silicone resin | Material Type: P.T.F.E. fibre fabric Av. Fibre Dia: 230 μm 3. Thickness: 2mm Void Volume: 55% Energy of Adhesion: ≃20 erg/cm$^2$ | 7 | 1 psi ↓ ↓ ↓ 20 psi | Precoalescing acceptable but high energy of adhesion with low void volume means coalesced oil cannot migrate. Therefore, pressure drop very unacceptable. |
| ⅜" Thick glass microfibre of | Material Type: Nylon non woven fabric Av. Fibre Dia: 40 μm | | 1 psi ↓ | Prefiltration acceptable but high fibre diameter means capture |

-continued

| Filter Tube Type | Internal Prefilter Winding Type and Characteristics | D/S Oil con". at 500 ppm $U$/S oil concentration using 100 ppm TX100 Detergent | Pressure Drop increase after One hours Operation | Comments |
|---|---|---|---|---|
| 1.0μm fibre dia. and 0.2 g/cm$^3$ density bonded with silicone resin | 4. Thickness: 2.5 mm<br>Void Volume: 72%<br>Energy of Adhesion: ≃20 erg/cm$^2$ | 10 | ↓<br>↓<br>2.5 psi | efficiency is lower than (2) but still acceptable. |

I claim:

1. A method of separating an oil phase from an oil and water emulsion stabilized by the presence of a detergent, which method comprises:
   (a) passing the stabilized oil and water emulsion through the wall of a prefilter structure, the prefilter structure having a predetermined thickness and made from a fibrous material, upon which fibrous material said oil phase to be separated exhibits an energy of adhesion of from about 2 to 50 ergs/cm$^2$, said fibrous material selected from the group consisting of polypropylene fibres, nylon fibres or glass fibres coated with nylon or polypropylene, said fibrous material comprising fibres having a dimension and a packing density such that, upon passage of the oil and water emulsion through said prefilter wall, oil droplets having diameter of greater than about 1 μm are captured, coalesced and larger oil droplets formed and released;
   (b) passing said oil and water emulsion and the larger oil droplets released from the prefilter through an adjacent peripheral wall of a filter tube under pressure, wherein the larger oil droplets released from the prefilter are coalesced and the oil phase separated under pressure, as the oil emulsion and the larger oil droplets are passed through the filter tube wall, in order to provide for the separation of the oil phase from the oil and water emulsion, with the oil phase coalescing after passage of the oil and water emulsion through said filter tube wall, the filter tube having a filter tube wall and an internal bore, which filter tube comprises a plurality of nonwoven, randomly disposed, glass fibres having interstices therebetween, and said fibres bonded together at the fibre crossover points by a fibre-binding agent, the fibres having a diameter of about 0.01 to 10 microns; and
   (c) collecting and removing the coalesced oil removed from the oil and water emulsion and permitting the passage of the essentially oil-free water phase from the oil and water emulsion.

2. The method of claim 1 wherein the fibrous material exhibits an energy of adhesion of from about 5 to 20 ergs/cm$^2$.

3. The method of claim 1, which method includes passing the oil and water emulsion from the filter tube wall through a peripheral, porous, coalescing material composed of an open-cell foam material or a porous fibrous material.

4. The method of claim 1 wherein the fibrous material of the prefilter comprises a nonwoven batt of the material secured within the internal bore of a filter tube and maintained in position within the internal bore, and which method includes passing the oil and water emulsion, from which the oil phase is to be removed, from the inside of the internal bore to the outside wall of the filter tube.

5. The method of claim 1 wherein the prefilter and the filter tube are dispersed within a sealed external housing having a means to remove coalesced and separated oil, a means to remove water and a means to introduce the stabilized oil-in-water emulsion into the interior of the prefilter structure, and which method includes:
   (a) introducing the stabilized oil-in-water emulsion into the interior of the prefilter structure under pressure;
   (b) removing water from which the coalesced and separated oil has been removed; and
   (c) removing the coalesced and separated oil after passage through the prefilter structure and filter tube.

6. The method of claim 1 wherein the stabilized oil emulsion is reduced in oil content from greater than 500 ppm to less than 15 ppm.

7. The method of claim 1 wherein the filter tube fibres have a diameter of from 0.1 to 3.5 microns.

8. The method of claim 1 wherein said filter tube fibres are at a fibre density of from 0.10 to 0.25 grams/cc.

9. The method of claim 1 which includes placing an external, porous, reinforcement sleeve adjacent to and about the filter tube.

10. The method of claim 1 wherein said filter tube is fabricated from borosilicate glass fibres, and the fibrebinding agent comprises a hardened silicone resin or an epoxy resin.

11. The method of claim 1 wherein oil droplets, having a diameter of greater than about 10 um, are captured and coalesced and larger oil droplets formed and released to the filter tube.

* * * * *